Aug. 12, 1969     W. F. SPLICHAL, JR     3,461,292
LOW LEVEL RADIATION MONITOR
Filed Nov. 10, 1966
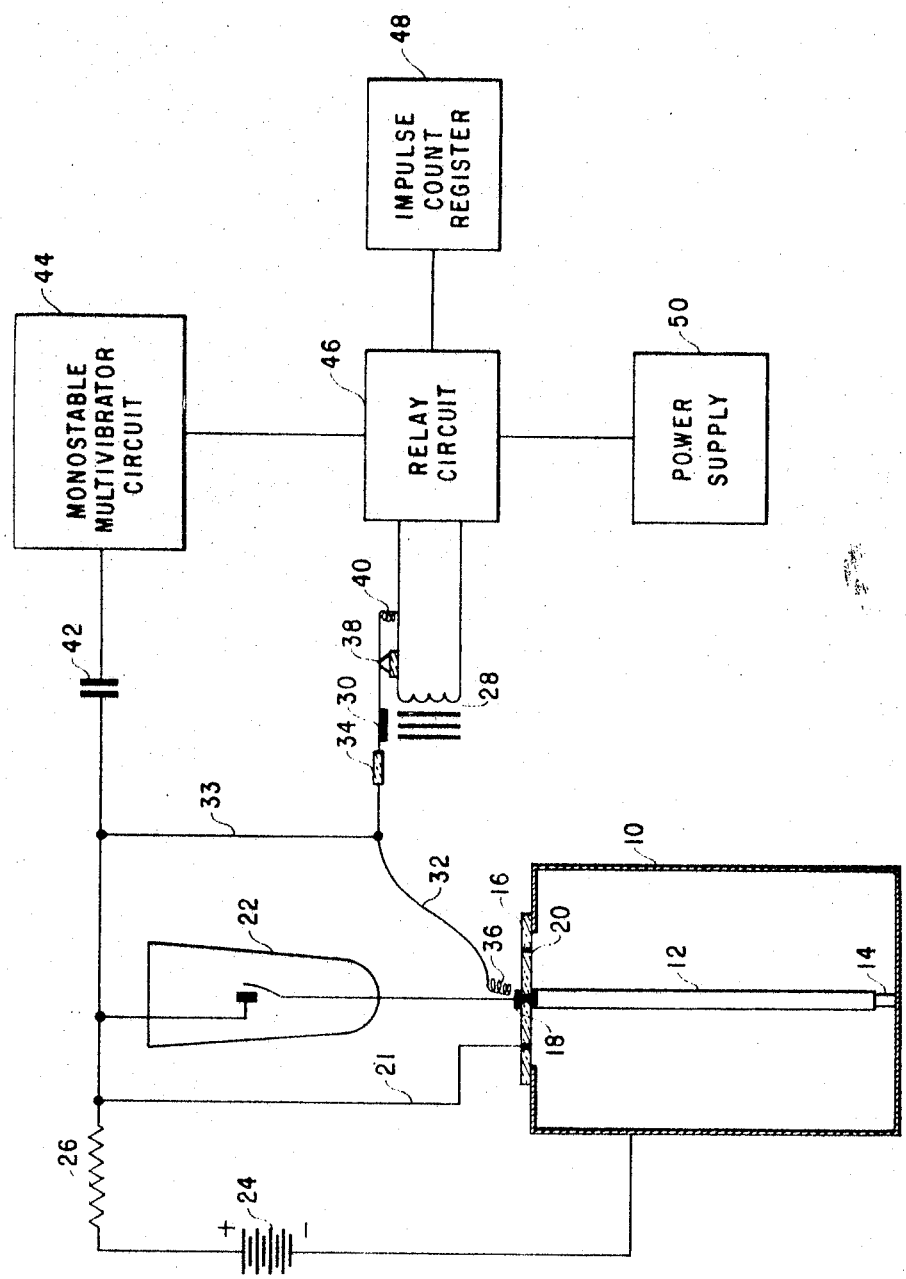
INVENTOR.
William F. Splichal Jr.
BY
Roland A. Anderson

United States Patent Office 3,461,292
Patented Aug. 12, 1969

3,461,292
LOW LEVEL RADIATION MONITOR
William F. Splichal, Jr., North Augusta, S.C., assignor to the United States of America as represented by the United States Atomic Energy Commission
Filed Nov. 10, 1966, Ser. No. 594,325
Int. Cl. G01t 1/18
U.S. Cl. 250—83.6                                      4 Claims

ABSTRACT OF THE DISCLOSURE

This invention relates to an improved radiation measuring device for measuring low-level or background ionizing radiation comprising an ionization chamber circuit, including an electrostatic relay to sense the voltage across the ionization chamber and providing a coupling means between the chamber circuit and a readout circuit, and a by-pass relay means connected to the chamber in parallel with the electrostatic relay. The by-pass relay is energized by a signal from the readout circuit and is adapted to recharge the ionization chamber. This by-pass relay means permits an ionization chamber having a relatively large capacitance to be used and will completely recharge the chamber after each counting cycle.

---

The invention described herein was made in the course of, or under, a contract with the U.S. Atomic Energy Commission.

The present invention relates to radiation detecting and measuring devices and more particularly to an improved radiation measuring device using an electrostatic relay for accurately monitoring low-level background ionizing radiation, such as naturally occurring radionuclides, cosmic rays, and radioactive fallout.

Ionizing radiation is commonly detected and measured by the use of a gas-filled ionization chamber connected in series with a direct current voltage source and a high resistance. Ions, resulting from radiation-induced ionization of the gas, collect on the charged electrodes of the chamber. Such collection results in the flow of small quantities of electrical current through the series circuit which in turn causes a voltage drop across the resistance proportional to the amount of radiation-induced ionization in the chamber.

A number of instruments, well known in the art, are available for measuring the output of an ionization chamber resulting from low-level background radiation, including vibrating-reed electrometers and D.C. amplifiers. Each of these instruments, however, has certain inherent disadvantages. The vibrating-reed electrometer has adequate accuracy and sensitivity for measuring low-level radiation, but it is relatively expensive and delicate for general background radiation monitoring. The D.C. amplifiers are subject to drift with time or temperature and consequently they are inaccurate and unreliable unless they receive constant adjustment for drift.

Another device that is used to measure small electric charges and small currents is an electrostatic relay or microcurrent sensor. The electrostatic relay is connected in series in an ionization chamber circuit and serves as a coupling element between the chamber and a suitable readout or counter circuit. This instrument has the advantages of being relatively inexpensive and not being subject to appreciable drift. Heretofore, however, it has been found suitable only for measuring relatively high radiation levels and has lacked adequate sensitivity to measure low-level background radiation. For instance, when the electrostatic relay is used with a small ionization chamber, the counting rate for background radiation is so low that significant leakage current results in poor accuracy. When it is used with a large ionization chamber, in an attempt to increase sensitivity to low-level radiation, the system becomes irratic and inoperative.

Therefore, it is an object of the present invention to provide an improved radiation measuring device for measuring low-level background radiation.

It is another object of the present invention to provide an inexpensive and accurate radiation monitoring device using an electrostatic relay in conjunction with a relatively large ionization chamber for detecting and measuring low-level background radiation.

It has been found that the large ionization chamber used in conjunction with the electrostatic relay was unreliable and inoperative because the increased capacitance resulting from the large chamber size prevented a complete recharge of the chamber in the short time interval that the electrostatic relay contacts are closed after each count pulse. Therefore, in accordance with the present invention, a means is provided for insuring that the ionization chamber is completely recharged after each count pulse. This is accomplished by providing the unique combination of an ionization chamber circuit, including an electrostatic relay to sense the voltage across the ionization chamber and to provide a coupling means between the chamber and a readout or counter circuit, and a by-pass relay means for completely recharging the ionization chamber. This combination provides an improved radiation measuring device capable of accurately determining low-level background radiation using an ionization chamber circuit having an economical and accurate electrostatic relay to sense the voltage across an ionization chamber having a relatively large capacitance and to couple the ionization chamber circuit to the readout circuit.

For a better understanding of the invention, reference is made to the single figure of the drawing that is a diagrammatic representation of a preferred embodiment of the present improved radiation measuring device. The device comprises essentially the combination of an ionization chamber circuit, a readout circuit, and a by-pass relay interconnected in the following described novel manner.

The ionization chamber circuit comprises a relatively large ionization chamber 10 connected in series with a direct current electrical potential 24, a voltage developing resistance 26, and an electrostatic relay 22. The ionization chamber 10 is a cylindrical container having a center electrode 12 coaxially supported at one end by an insulated support member 14 and at the other end by an insulated end closure 16. Both the support member 14 and the end closure 16 are made of a suitable non-conductive material. End closure 16, mounted on one end of the chamber 10, has an external connector 18 which penetrates the closure and provides a connection between the center electrode 12 and one terminal of an electrostatic relay 22. A ring 20 of conducting material, disposed on both surfaces of the end closure 16 around external connector 18, is connected by conductor 21 to the ionization chamber circuit. Ring 20 is disposed at a sufficient distance from connector 18 to maintain the potential difference between the connector 18 and ring 20 at a value less than the potential difference applied across the chamber electrodes. In this preferred embodiment the potential difference between the ring 20 and the connector 18 is between about 0 to 70 volts instead of the 300 volts applied across the chamber. This minimizes insulator leakage across the chamber.

Ionization chamber 10 may be made of any suitable conductive material such as aluminum or steel and it must be large enough to collect a sufficient amount of ionization current to actuate the electrostatic relay 22 in a relatively short period of time. Although the exact size of the chamber is not critical, a large chamber having an effective volume of about 25 liters is sufficiently large and a chamber having an effective volume of about 160 liters is preferred. The latter size is preferred because it is equivalent to readily obtainable 55-gallon drums and requires a saturation voltage for operation at atmospheric pressure of only about 250 volts. Thus, a standard 300 volt cell may be used for the direct current electrical potential 24. The center electrode 12 should extend almost the full length of the chamber 10 and may be made of any suitable conductive material, such as aluminum.

The electrostatic relay 22 has one terminal connected to the center electrode 12 through external connector 18 and another terminal connected to complete the series circuit of the ionization chamber circuit and to a common output to the readout circuit through a coupling capacitor 42. A sufficiently sensitive and accurate electrostatic relay for use in this preferred embodiment is described in detail in U.S. Patent 3,151,710 and is available commercially as a Microcurrent Sensor RW600 from Warnecke Electron Tubes, Inc., Des Plaines, Ill. This electrostatic relay (microcurrent sensor) has a minimum charge detection of about $10^{-10}$ coulombs enabling it to integrate small electric charges down to about $10^{-10}$ coulomb and to measure very small currents down to about $10^{-10}$ ampere at an accuracy of $\pm 1.5\%$ at constant temperature.

The readout circuit, which is connected to the ionization chamber circuit by the coupling capacitor 42 comprises a monostable multivibrator circuit 44, a relay circuit 46 and an impulse count register 48. A voltage potential is supplied to these components by a power supply 50. Monostable multivibrator circuit 44 is capable of being triggered by a voltage pulse generated when the electrostatic relay contacts close in the ionization chamber circuit and is connected to the relay circuit 46. Relay circuit 46 has outputs to the impulse count register 48 and the by-pass relay 28 and controls the power supply 50 which energizes these respective components in response to the voltage pulse fed from the multivibrator circuit 44.

A by-pass relay 28 that is arranged to be actuated by the output of the readout circuit is connected in parallel with the electrostatic relay 22. Relay 28 includes a movable armature 30 pivotally mounted on an armature support 38. Armature 30 is provided with an armature return spring 40 and an armature extension 32 is attached to armature 30 by means of an insulator 34. Armature extension 32, which may be made of any conductive material, such as copper, has one end disposed adjacent external connector 18 and has attached a conductive contact spring 36 to insure good electrical contact with the external connector 18. When the by-pass relay is not energized, the contact spring 36 is in spaced relationship to the external connector 18 and is maintained at a distance to insure sufficient electrical insulation therefrom. The connection in parallel to the electrostatic relay 22 is completed by a by-pass conductor 33 connecting the armature extension 32 to the output terminal of electrostatic relay 22. Thus contact spring 36 and connector 18 provide a switchable pair of by-pass contacts around electrostatic relay 22 that is actuated by energizing by-pass relay 28.

Although the figure of this illustrative embodiment shows the by-pass relay 28 separated from the ionization chamber 10, it is preferred that these components be mounted upon the insulated end closure 16 adjacent external connector 18. Mounting these components in this manner reduces the amount of leakage resulting from long conductors and simplifies the installation of the armature extension 32 and contact spring 36 of the by-pass relay 28.

From the foregoing description of the arrangement of the electrical components of the present invention, the following explanation of the operation thereof will be understood by those skilled in the art. At the beginning of the operating cycle, the ionization chamber 10 is fully charged, i.e. the potential of its center electrode 12 is the same as the D.C. potential 24, and the contacts of the electrostatic relay 22 immediately separate because they also are at the same potential. When the ionizing radiation entering the ionization chamber reduces the stored charge (approximately $10^{-10}$ coulomb when using the preferred electrostatic relay herein described) in the capacitance of the chamber, the voltage across the chamber electrodes drops and, as a result, the increasing electrostatic force between the electrostatic relay elements causes the contacts to close. The D.C. potential 24 is then in series with the chamber 10 for a very short period (about 2 $\mu$sec.) allowing the chamber to only partially recharge for the next cycle. Although the period that the contacts are closed varies slightly between individual electrostatic relays, the response time is very short because the electrostatic relay is so sensitive that only a slight increase in voltage across the large chamber will cause the contacts to open. This recharging current passes through voltage developing resistor 26, and the resulting voltage pulse is coupled by capacitor 42 to the monostable multivibrator circuit 44 which is triggered thereby. The triggering of the multivibrator circuit 44 actuates relay circuit 46 which causes the impulse count register 48 to cycle and count the pulse. Simultaneously, the relay circuit 46, responding to a signal from the multivibrator circuit 44, feeds a voltage pulse to energize by-pass relay 28 which actuates armature 30 and armature extension 32 to provide a contact between external connector 18 and contact spring 36. Thus, the by-pass recharging circuit is closed for a sufficient period to completely recharge the ionization chamber 10. The period of closure of the recharging circuit is regulated by the multivibrator circuit 44 and should be at least about 100 milliseconds when using a large ionization chamber the size of a 55-gallon drum. However, a 250 millisecond closure period is preferred to insure that the chamber is fully charged. Using the present preferred embodiment, background radiation measurements may be made in the range of about 4 $\mu$r./hr. to about 40 $\mu$r./hr. with an accuracy of about $\pm 10\%$. Current output from the 55-gallon drum chamber is about $3.2 \times 10^{-13}$ amperes for normal laboratory background. A recycling pulse at a background radiation level of about 30 $\mu$r./hr. will occur about every 1.5 hours with an electrostatic relay having a charge measuring sensitivity of $7.5 \times 10^{-10} \pm 10\%$ coulomb.

Although this invention is described with reference to its preferred embodiment, it is contemplated that obvious modifications will occur to those skilled in the art and that such may be made without departing from the scope of this invention which is limited only as indicated in the appended claims.

What is claimed is:
1. An improved device for measuring background radiation comprising:
  (a) An ionization chamber circuit including in series;
    (1) an ionization chamber capable of holding a finite electric charge for discharge in response to ionizing radiation, said chamber having a central electrode, an outer wall serving as a peripheral electrode, a dielectric closure engaging said outer wall and central electrode, and a ring electrode disposed on said closure between said peripheral and central electrodes to minimize the electrical potential gradient adjacent said central electrode,
    (2) a source of direct current for establishing a finite electric charge from said peripheral to said central and ring electrodes within said ionization chamber, and
    (3) an electrostatic relay with normally open contacts and means for closing said contacts in response to discharge of said finite electric charge within said ionization chamber, said circuit being adapted to produce a voltage pulse corresponding to each discharge of said ionization chamber;

(b) a readout circuit coupled to said ionization chamber circuit between said current source and electrostatic relay, said readout circuit being adapted to count and produce a signal in response to said voltage pulse; and (c) normally open bypass contacts in electrical parallel with said electrostatic relay contacts, and electromagnetic means responsive to said signal from said readout circuit for closing said bypass contacts to recharge said ionization chamber.

2. The improved radiation measuring device of claim 1 wherein said ionization chamber has an effective volume of at least 25 liters.

3. The improved radiation measuring device of claim 1 wherein said electrostatic relay has a charge measuring sensitivity of about $10^{-10}$ coulomb.

4. The improved radiation measuring device of claim 1 wherein the by-pass contacts and electromagnetic means comprise an electromagnetic relay mounted adjacent to the external surface of said dielectric closure, said relay having an insulated movable armature, a conducting arm attached at one end to said armature and extending to a position in spaced relationship to said central electrode, an electrical contact mounted on the other end of said arm to contact said central electrode upon energizing said electromagnetic relay.

References Cited

UNITED STATES PATENTS

| | | | |
|---|---|---|---|
| 2,824,973 | 2/1958 | Gundach et al. | 250—83.6 |
| 3,214,588 | 10/1965 | Cooke-Yarborough | 250—83.6 |
| 3,319,066 | 5/1967 | Gernert | 250—83.6 |

RALPH G. NILSON, Primary Examiner

D. L. WILLIS, Assistant Examiner

U.S. Cl. X.R.

250—83; 313—93